(12) United States Patent
McCue

(10) Patent No.: US 9,290,870 B2
(45) Date of Patent: Mar. 22, 2016

(54) STITCHING APPARATUS AND METHOD OF USE

(71) Applicant: Geoff McCue, Lawrence, KS (US)

(72) Inventor: Geoff McCue, Lawrence, KS (US)

( * ) Notice: Subject to any disclaimer, the term of this patent is extended or adjusted under 35 U.S.C. 154(b) by 0 days.

(21) Appl. No.: 14/043,416

(22) Filed: Oct. 22, 2013

(65) Prior Publication Data

US 2014/0216633 A1    Aug. 7, 2014

Related U.S. Application Data

(60) Provisional application No. 61/760,548, filed on Feb. 4, 2013.

(51) Int. Cl.

| | |
|---|---|
| *B32B 7/08* | (2006.01) |
| *B29C 65/00* | (2006.01) |
| *B32B 37/00* | (2006.01) |
| *B32B 38/00* | (2006.01) |
| *C08J 5/00* | (2006.01) |
| *D04H 3/04* | (2012.01) |
| *B29C 65/10* | (2006.01) |
| *D05B 23/00* | (2006.01) |
| *D05B 1/00* | (2006.01) |
| *D05B 17/00* | (2006.01) |
| *B29C 65/18* | (2006.01) |
| *B29C 65/62* | (2006.01) |
| *B29C 65/72* | (2006.01) |

(52) U.S. Cl.
CPC ............... *D05B 17/00* (2013.01); *B29C 65/18* (2013.01); *B29C 65/62* (2013.01); *B29C 65/72* (2013.01); *B29C 66/43* (2013.01); *B29C 66/729* (2013.01); *B29C 66/8322* (2013.01)

(58) Field of Classification Search
CPC ........ B29C 65/00; B29C 65/02; B29C 65/18; B29C 65/20; B29C 65/56; B29C 65/62; B29C 65/72; B29C 66/1122; B29C 66/729; B29C 66/43; B29C 66/80; B29C 66/832; B29C 66/8322; B29C 66/83221; A41D 27/24; D05B 3/00; D05B 17/00; D05B 23/00; D05B 81/00
USPC ............. 156/60, 91, 92, 93, 282, 290, 291, 156/308.2, 308.4, 309.6, 309.9, 349, 391, 156/433, 436, 439, 440, 499, 498, 538, 539, 156/543; 112/2, 78, 98, 154
See application file for complete search history.

(56) References Cited

U.S. PATENT DOCUMENTS 3,031,349 A * 4/1962 Dritz ......................... 156/513

* cited by examiner

*Primary Examiner* — Philip Tucker
*Assistant Examiner* — Brian R Slawski
(74) *Attorney, Agent, or Firm* — Christina Chamberlain; Chamberlrain Legal Services, PLLC

(57) ABSTRACT

The present invention is a stitching apparatus and method of use wherein large spools of material can be used and driven into position in a sewing, embroidery or other stitching machine, thereby decreasing the complexity of the stitching process and reducing breakage and thread depletion. The apparatus generally comprises an upper thread feeding assembly, a lower thread feeding assembly, a stitching surface area and an activation assembly, wherein the activation assembly bonds the upper thread to the lower thread at the stitching surface area.

10 Claims, 5 Drawing Sheets

STITCHING APPARATUS AND METHOD OF USE

RELATED APPLICATIONS

This application claims priority to U.S. Provisional Application No. 61/760,548 filed Feb. 4, 2013. The entire contents of the above application are hereby incorporated by reference as though fully set forth herein.

FIELD

The present invention relates to the field of sewing and embroidery. More specifically, the present invention relates to a new stitching apparatus and method of use for stitching or sewing with both traditional and reactive threads and materials.

BACKGROUND

Traditionally, sewing and embroidery requires the use of an upper and lower thread. The upper thread is pushed through a needle where it is moved up and down through the sewing foot and fabric being sewn. The lower thread is wound on a spool called a bobbin. The entire bobbin assembly consists of housing, rotating hook, spool and casing. The upper thread is moved downward into the bobbin case, where the hook grabs the thread and feeds it around the spool to form a loop, which is then tightened around the lower thread.

Since the upper thread must loop around the lower thread, the lower thread cannot be continuous. Therefore, the bobbin spool must be wound with a limited amount of thread. The spool can now be wrapped by the upper thread to meet and form a stitch. The problem with this traditional approach is that the bobbin spool, having a limited amount of thread, must be constantly replaced. Since the upper thread doesn't have any limitations, large spools or skeins can be utilized for longer sewing times. Bobbin threads are also subject to breakage and the casing becomes filled with lint and thread scraps.

It is therefore an object of the present invention to introduce a new, inventive concept that uses either traditional thread or a reactive material (such as, but not limited to fusible, self-bonding or phase change material) for the upper thread and replaces the lower thread with a reactive material, such as self bonding, phase change or fusible compounds. (i.e. polyester, nylon, acrylic or copolymer, etc.), that can be inserted by rolling; pumping; or pushing the material into the space previously occupied by the lower thread. A phase change material (liquid to solid or solid to solid) exhibits the best characteristics.

BRIEF SUMMARY OF THE INVENTION

It is the object of the present invention to address the challenge presented by a traditional spooled bobbin sewing or embroidery machine system. With the present invention, large spools of material can be used and driven into position in a sewing, embroidery or other stitching machine, decreasing the complexity of the stitching process and reducing breakage and thread depletion. The invention is a stitching apparatus for forming a stitch in a piece of fabric or other material suitable to receive a stitch, the apparatus generally comprised of an upper thread feeding assembly, a lower thread feeding assembly, a stitching surface area and an activation assembly, wherein the activation assembly bonds the upper thread to the lower thread at the stitching surface area. The invention further comprises a method for forming a stitch in a piece of fabric or other material suitable to receive a stitch wherein an upper thread is passed through a stitching surface, a lower thread is positioned on the stitching surface, the upper and lower threads are fused and the upper thread is passed back through the stitching surface.

In one embodiment, the upper thread is made of traditional thread that is guided through a standard needle that may or may not have a reactive tip. This needle is now driven down though the pressure foot of the machine through the fabric and into the lower material acting as the lower or bobbin thread. The tip activates (i.e. heats, etc.) and at this point the material fuses around the thread and the needle is refracted. A pressure foot or hoop moves the fabric drawing materials from both the upper needle and the lower tube where the process cycle begins again.

In another embodiment, the upper thread is made of a reactive material in fiber form that is guided through a hollow needle that has a reactive tip. This needle is now driven down though the pressure foot of the machine through the fabric and into the lower material acting as the lower or bobbin thread. The tip activates (i.e. heats) and at this point the two materials fuse and the needle is retracted. The pressure foot or hoop moves the fabric, drawing bonding material from both the upper needle and the lower tube where the process cycle begins again.

In yet another embodiment, both the upper and lower mechanisms are tubular needles with reactive tips. The upper needle is driven down through the pressure foot and fabric while at the same time the lower needle is drive up through the fabric to meet the upper needle. Both tips are activated and fuse the materials at or in the fabric. Then both needles retract and the pressure foot moves the material, drawing a length of bonding material from their respective tubes. Subsequently, the stitching process begins again and the above process is repeated.

DETAILED DESCRIPTION

Figure 1:
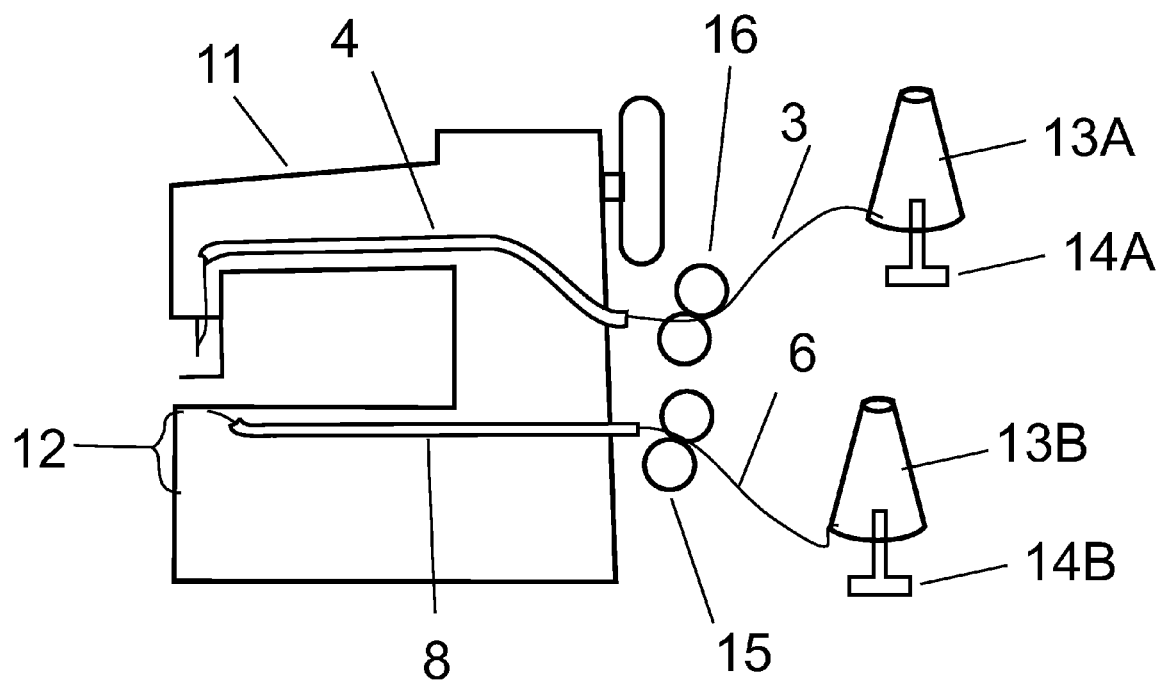
FIG. 1 is a side view of the present invention.

Turning to FIG. 1, the stitching apparatus 11 of the present invention is shown with an upper thread feeding assembly and a lower thread feeding assembly. The upper thread feeding assembly holds a spool of upper thread material 3 on spool 13A that is held in place by bracket 14A. The upper thread material 3 enters a drive/pump mechanism 16 that inserts upper thread material 3 by rolling; pumping; or pushing the material into the stitching apparatus 11. The upper thread material 3 moves through a container 4 sized and dimensioned such that the upper thread 3 is pushed by the drive mechanism 16 into the stitching apparatus 11. In the preferred embodiment, the container 4 is substantially cylindrical or "tube" shaped. The lower thread exits the container 4 and enters the stitching area 12.

The lower thread feeding assembly holds a spool of lower thread material 6 on spool 13B that is held in place by bracket 14B. The upper thread material 6 enters a drive/pump mechanism 15 that inserts lower thread material 6 by rolling; pumping; or pushing the material into the stitching apparatus 11. The lower thread material 6 moves through a container 8 sized and dimensioned such that the upper thread 6 is pushed by the drive mechanism 15 into the stitching apparatus 11. In the preferred embodiment, the container 8 is substantially cylindrical or "tube" shaped. The lower thread exits the container 8 and enters the stitching area 12.

Figure 2:
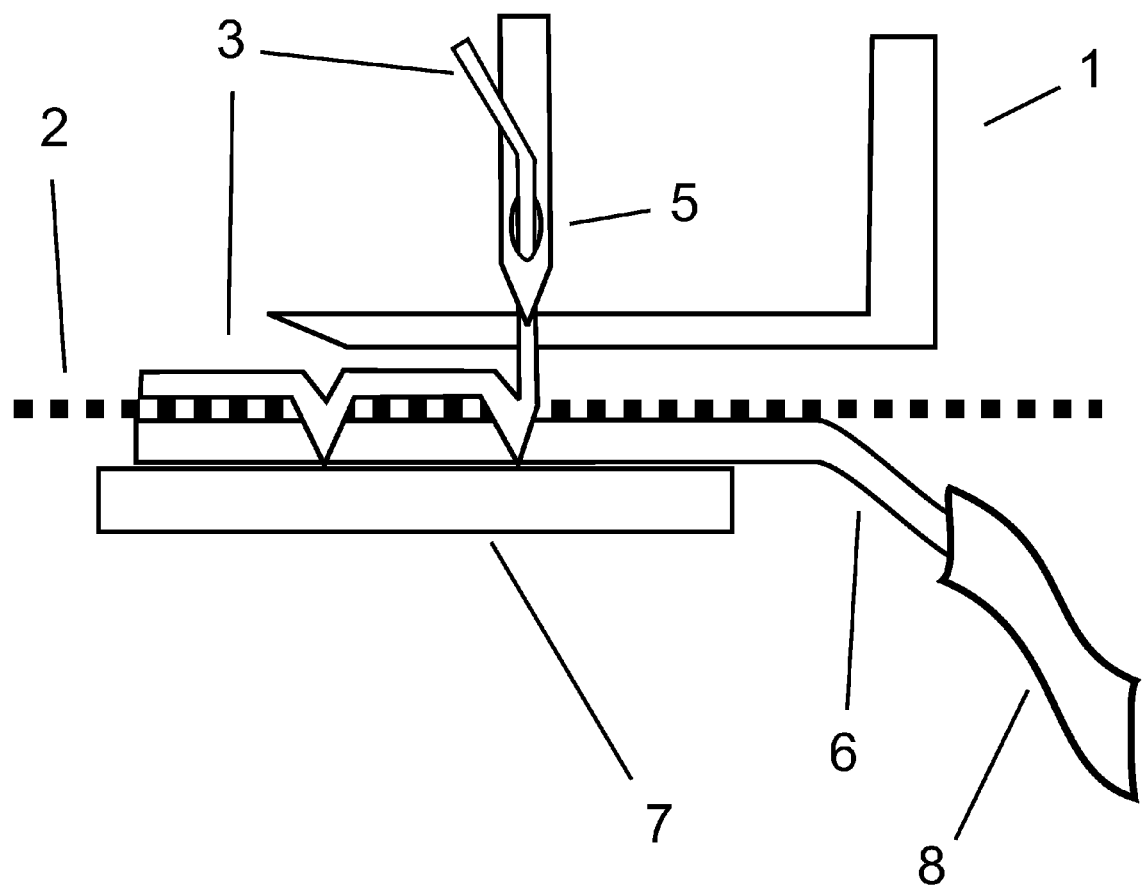
FIG. 2 is an expanded view of one embodiment of the present invention.

Turning to FIG. 2, in one embodiment of the present invention, the upper thread 3 is a traditional thread such as cotton, synthetic or blends of multifilament configuration fed through needle tip 5 and the lower thread 6 is a self-bonding, phase change material capable of changing phases when heated and/or cooled. Examples of a suitable lower thread material include but are not limited to polyester, nylon, acrylic, copolymer or mixtures thereof. The upper thread feeding assembly uses a pressure foot 1 to move the move the stitching surface 2 through the stitching apparatus and a guide plate 7 to move the lower thread material 6 into position on the stitching surface 2.

Figure 3:
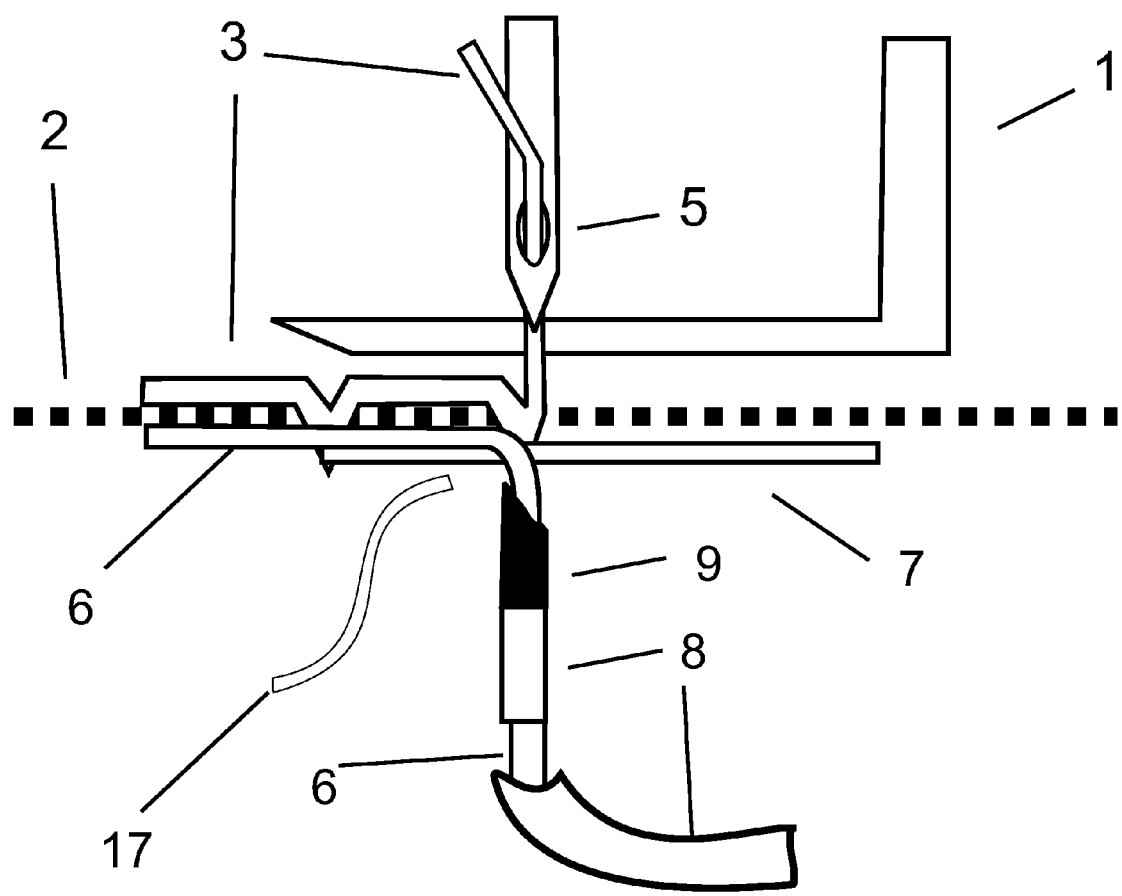
FIG. 3 is an expanded view of a second embodiment of the present invention.

Turning to FIG. 3, in a second embodiment of the present invention, the upper thread 3 is a traditional thread such as cotton, synthetic or blends of multifilament configuration fed through needle tip 5 and the lower thread 6 is a self-bonding, phase change material capable of changing phases when heated and/or cooled. Examples of a suitable lower thread material include but are not limited to polyester, nylon, acrylic, copolymer or mixtures thereof. The upper thread feeding assembly uses a pressure foot 1 to move the move the stitching surface 2 through the stitching apparatus 11 and a guide plate 7 to move the lower thread material 6 into position on the stitching surface 2. The lower thread material 6 is fed into the stitching area using container 8 and an activator assembly activates the lower thread material 6. In the preferred embodiment, the activator assembly is a needle with a heating apparatus 9 located within the tip of the container 8. The heating apparatus 9 heats the lower thread material 6 and upper thread material 3, thereby fusing the two materials. In the preferred embodiment, the stitching apparatus further comprises a cooling apparatus 17 that cools the fused upper and lower threads 3 and 6 to form a solid stitch from the fused upper and lower threads 3 and 6.

Figure 4:
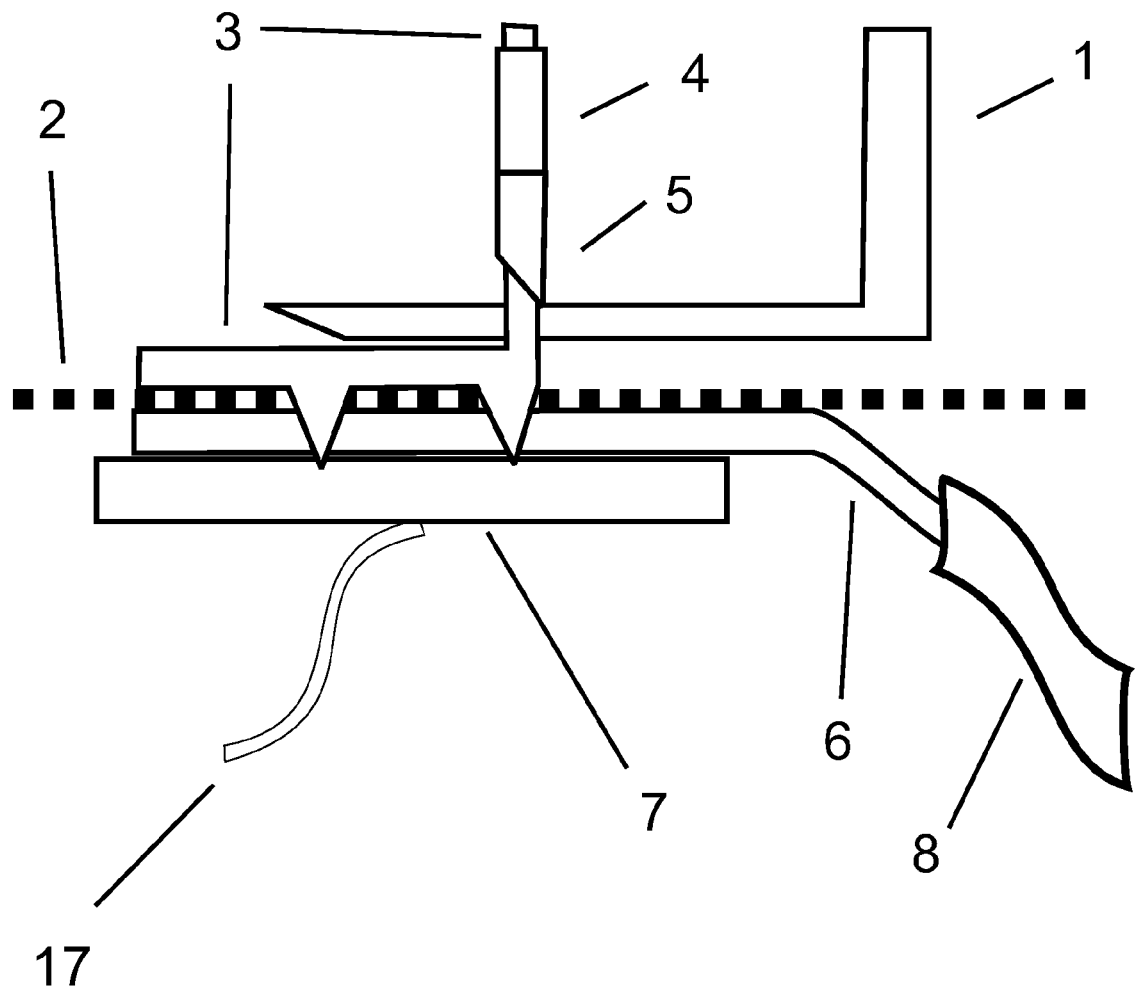
FIG. 4 is an expanded view of a third embodiment of the present invention.

Turning to FIG. 4, in a third embodiment of the present invention the upper thread 3 is a self-bonding, phase change material capable of changing phases when heated and/or cooled fed through a needle and the lower thread 6 is a self-bonding, phase change material capable of changing phases when heated and/or cooled. Examples of suitable upper and lower thread materials include but are not limited to polyester, nylon, acrylic, copolymer or mixtures thereof. The upper thread feeding assembly uses a pressure foot 1 to move the move the stitching surface 2 through the stitching apparatus and a guide plate 7 to move the lower thread material 6 into position on the stitching surface 2. The lower thread material 6 is fed into the stitching area using container 8. In the preferred embodiment, the activator assembly is a needle with heating apparatus 5 located within the tip of the container 4. The heating apparatus 5 heats the upper thread material 3 and lower thread material 6, thereby fusing the two materials. In the preferred embodiment, the stitching apparatus further comprises a cooling apparatus 17 that cools the fused upper and lower threads 3 and 6 to form a solid stitch from the fused upper and lower threads 3 and 6.

Figure 5:
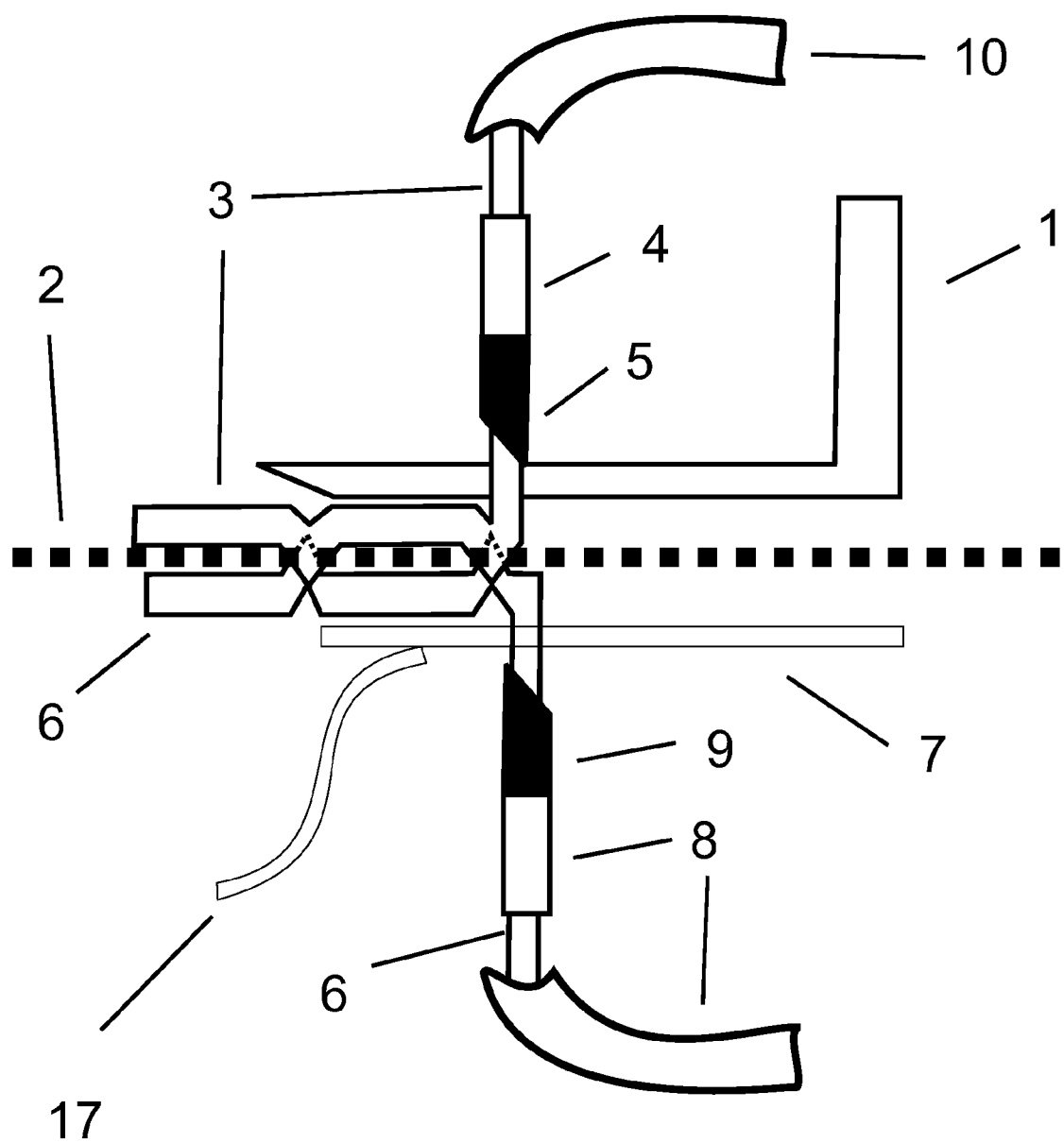
FIG. 5 is an expanded view of a fourth embodiment of the present invention.

Turning to FIG. 5, in a fourth embodiment of the present invention, the upper thread 3 is a self-bonding, phase change material capable of changing phases when heated and/or cooled fed through a needle and the lower thread 6 is a self-bonding, phase change material capable of changing phases when heated and/or cooled. Examples of a suitable upper and lower thread materials include but are not limited to polyester, nylon, acrylic, copolymer or mixtures thereof. The upper thread feeding assembly uses a pressure foot 1 to move the move the stitching surface 2 through the stitching apparatus and a guide plate 7 to move the lower thread material 6 into position on the stitching surface 2. The lower thread material 6 is fed into the stitching area using container 8. In the preferred embodiment, the activator assembly is a plurality of needles, one for the upper thread and one for the lower thread, with a heating apparatus 5 located within the tip of the container 4 and a heating apparatus 9 located within the tip of container 8. The lower thread material 6 is fed into the stitching area using container 8. The heating apparatus 5 and 9 heat the upper thread material 3 and lower thread material 6, thereby fusing the two materials. In the preferred embodiment, the stitching apparatus further comprises a cooling apparatus 17 that cools the fused upper and lower threads 3 and 6 to form a solid stitch from the fused upper and lower threads 3 and 6.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/ or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A combination of a stitching apparatus and thread materials comprising (1) an upper thread made from an upper thread material; (2) an upper thread feeding assembly for feeding the upper thread material; (3) a lower thread made from a self-bonding, phase change lower thread material capable of changing phases when heated or cooled; (4) a stitching surface area; (5) a lower thread feeding assembly for feeding the lower thread material, the lower thread feeding assembly comprising a guide plate, a drive mechanism, and a container sized and dimensioned such that said lower thread material is pushed through the container by the drive mechanism and towards the guide plate and onto the stitching surface area; (6) a cooling apparatus; and (7) at least one activation assembly; wherein at least one activation assembly bonds the upper thread exiting the upper thread feeding assembly to the lower thread exiting the lower thread feeding assembly at the stitching surface area with the upper thread material passed through the stitching surface area and the lower thread material positioned on the stitching surface area and wherein the cooling apparatus cools the activated upper and lower thread materials without directly touching the upper and lower thread materials such that the upper and lower thread materials are fused; and wherein the upper thread is then passed back through the stitching surface area.

2. The combination of claim 1 further wherein the upper thread feeding assembly comprises a pressure foot, a drive mechanism, a container sized and dimensioned such that said upper thread is pushed through the container by the drive mechanism and towards the pressure foot.

3. The combination of claim 2 wherein said activation assembly comprises a needle tip and heating apparatus located at the end of said container next to said pressure foot of the upper thread feeding assembly.

4. The combination of claim 3 wherein said upper thread material is made from a self-bonding, phase change upper thread material capable of changing phases when heated or cooled and undergoes a phase change when heated by said heating apparatus.

5. The combination of claim 4 wherein said upper thread material undergoes a phase change when cooled by said cooling apparatus.

6. The combination of claim 1 wherein said activation assembly comprises a needle tip and heating apparatus at the end of said container next to said guide plate of the lower thread feeding assembly.

7. The combination of claim 6 wherein said lower thread material undergoes a phase change when heated by said heating apparatus.

8. The combination of claim 7 wherein said lower thread material undergoes a phase change when cooled by said cooling apparatus.

9. The combination of claim 1 wherein one said activation assembly is located adjacent to said upper thread feeding assembly and a second said activation assembly is located adjacent to said lower thread feeding assembly.

10. The combination of claim 1 wherein said upper thread material is selected from the group comprising polyester, nylon, acrylic, polymers, copolymers or mixtures thereof.

* * * * *